(12) United States Patent
Van Doorn

(10) Patent No.: US 9,442,495 B2
(45) Date of Patent: Sep. 13, 2016

(54) METHOD FOR SUPPLYING A DRIVE UNIT

(71) Applicant: AUDI AG, Ingolstadt (DE)

(72) Inventor: Rene Van Doorn, Obersulm-Willsbach (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/386,384

(22) PCT Filed: Mar. 18, 2013

(86) PCT No.: PCT/EP2013/000813
§ 371 (c)(1),
(2) Date: Sep. 19, 2014

(87) PCT Pub. No.: WO2013/139459
PCT Pub. Date: Sep. 26, 2013

(65) Prior Publication Data
US 2015/0047711 A1      Feb. 19, 2015

(30) Foreign Application Priority Data

Mar. 21, 2012   (DE) ......................... 10 2012 005 689

(51) Int. Cl.
*G05D 16/20*      (2006.01)
*F17C 7/00*       (2006.01)
(Continued)

(52) U.S. Cl.
CPC .............. *G05D 16/204* (2013.01); *F17C 7/00* (2013.01); *F17C 13/025* (2013.01);
(Continued)

(58) Field of Classification Search
CPC . G05D 16/204; F17C 13/026; F17C 13/025; Y10T 137/87684; Y10T 137/87692; Y10T 137/776

USPC .......................................... 137/606, 607, 487
See application file for complete search history.

(56) References Cited

U.S. PATENT DOCUMENTS 5,394,704 A * 3/1995 Johnson ......................... 62/51.1
5,597,020 A * 1/1997 Miller et al. .................... 141/95
(Continued)

FOREIGN PATENT DOCUMENTS

CA         2 770 365 A1        5/2011
CN         101488576           7/2009
(Continued)

OTHER PUBLICATIONS

WIPO provided English translation of the International Preliminary Report on Patentability uploaded on the WIPO website on Sep. 21, 2014 for corresponding International Patent Application No. PCT/EP2013/000813.

(Continued)

*Primary Examiner* — Kevin Murphy
*Assistant Examiner* — Nicole Wentlandt
(74) *Attorney, Agent, or Firm* — Staas & Halsey LLP

(57) ABSTRACT

A method supplies a gas, stored in multiple vessels, to a drive assembly of a motor vehicle. Each vessel is assigned a valve for opening and closing the vessel and a gas sensor, in the form of a temperature sensor, for determining a temperature as a state variable of the gas in the vessel. The vessels are connected to the drive assembly via a common line. Along the common line, there is arranged at least one gas sensor, which is common to all of the vessels, for determining at least one state variable of the gas. For the supply to the drive assembly, in each case only one of the valves is opened and all of the other valves are closed. The open valve is closed when at least one determined state variable deviates from a setpoint value by a tolerance value.

20 Claims, 1 Drawing Sheet

(51) Int. Cl.
*H01M 8/04* (2016.01)
*F17C 13/02* (2006.01)

(52) U.S. Cl.
CPC ....... *F17C 13/026* (2013.01); *H01M 8/04201* (2013.01); *H01M 8/04328* (2013.01); *H01M 8/04373* (2013.01); *H01M 8/04388* (2013.01); *H01M 8/04753* (2013.01); *H01M 8/04776* (2013.01); *F17C 2201/058* (2013.01); *F17C 2205/0138* (2013.01); *F17C 2205/0146* (2013.01); *F17C 2205/0326* (2013.01); *F17C 2221/012* (2013.01); *F17C 2221/033* (2013.01); *F17C 2223/0123* (2013.01); *F17C 2223/036* (2013.01); *F17C 2225/0123* (2013.01); *F17C 2225/036* (2013.01); *F17C 2227/042* (2013.01); *F17C 2250/032* (2013.01); *F17C 2250/043* (2013.01); *F17C 2250/0426* (2013.01); *F17C 2250/0439* (2013.01); *F17C 2250/072* (2013.01); *F17C 2265/066* (2013.01); *F17C 2270/0168* (2013.01); *F17C 2270/0178* (2013.01); *F17C 2270/0184* (2013.01); *F17C 2270/0763* (2013.01); *H01M 8/04208* (2013.01); *H01M 2250/20* (2013.01); *Y02E 60/321* (2013.01); *Y02E 60/50* (2013.01); *Y02T 90/32* (2013.01); *Y10T 137/0324* (2015.04); *Y10T 137/87684* (2015.04)

(56) References Cited

U.S. PATENT DOCUMENTS

| | | | |
|---|---|---|---|
| 5,806,316 | A | 9/1998 | Avakov et al. |
| 2005/0061371 | A1 | 3/2005 | Kimbara et al. |
| 2006/0078768 | A1 | 4/2006 | Pechtold et al. |
| 2006/0246177 | A1 | 11/2006 | Miki et al. |
| 2007/0012362 | A1 | 1/2007 | Thyroff |
| 2008/0000542 | A1* | 1/2008 | Cohen et al. .................. 141/18 |
| 2009/0014089 | A1 | 1/2009 | Takeshita et al. |
| 2009/0029226 | A1 | 1/2009 | Yamagishi et al. |
| 2009/0142637 | A1* | 6/2009 | Handa ............................ 429/26 |
| 2010/0006596 | A1 | 1/2010 | Kanie |
| 2010/0193045 | A1 | 8/2010 | Xu |
| 2010/0253529 | A1 | 10/2010 | Umayahara |

FOREIGN PATENT DOCUMENTS

| | | |
|---|---|---|
| DE | 693 01 657 T2 | 10/1996 |
| DE | 10 2004 037 851 B4 | 4/2009 |
| DE | 10 2006 031 875 B4 | 4/2009 |
| DE | 11 2007 000 513 T5 | 6/2009 |
| DE | 11 2007 002 802 T5 | 9/2009 |
| DE | 10 2005 047 972 B4 | 1/2010 |
| DE | 11 2008 002 771 T5 | 12/2010 |
| DE | 10 2012 005 689.3 | 3/2012 |
| EP | 1 653 148 A1 | 5/2006 |
| JP | 2001-302201 A | 10/2001 |
| JP | 2004-84808 A | 3/2004 |
| JP | 2006-269330 A | 10/2006 |
| JP | 2009-108926 A | 5/2009 |
| WO | PCT/EP2013/000813 | 3/2013 |

OTHER PUBLICATIONS

International Search Report mailed Sep. 17, 2013 for corresponding International Patent Application No. PCT/EP2013/000813.
Office Action issued Mar. 4, 2013 for corresponding German Patent Application No. 10 2012 005 689.3.
Decision to Grant issued Apr. 24, 2013 for corresponding German Patent Application No. 10 2012 005 689.3.
Chinese Office Action dated Apr. 23, 2015 from Chinese Patent Application No. 201380015149.0, 70 pages.
European Examination Report dated Dec. 3, 2015 from European Patent Application No. 13 712 139.8, 4 pages.
Corrected version of English translation of the International Preliminary Report on Patentability dated Jan. 28, 2016 for corresponding International Patent Application No. PCT/EP2013/000813, 8 pages.
Chinese Office Action dated Jan. 5, 2016 from Chinese Patent Application No. 201380015149.0, 3 pages.

* cited by examiner

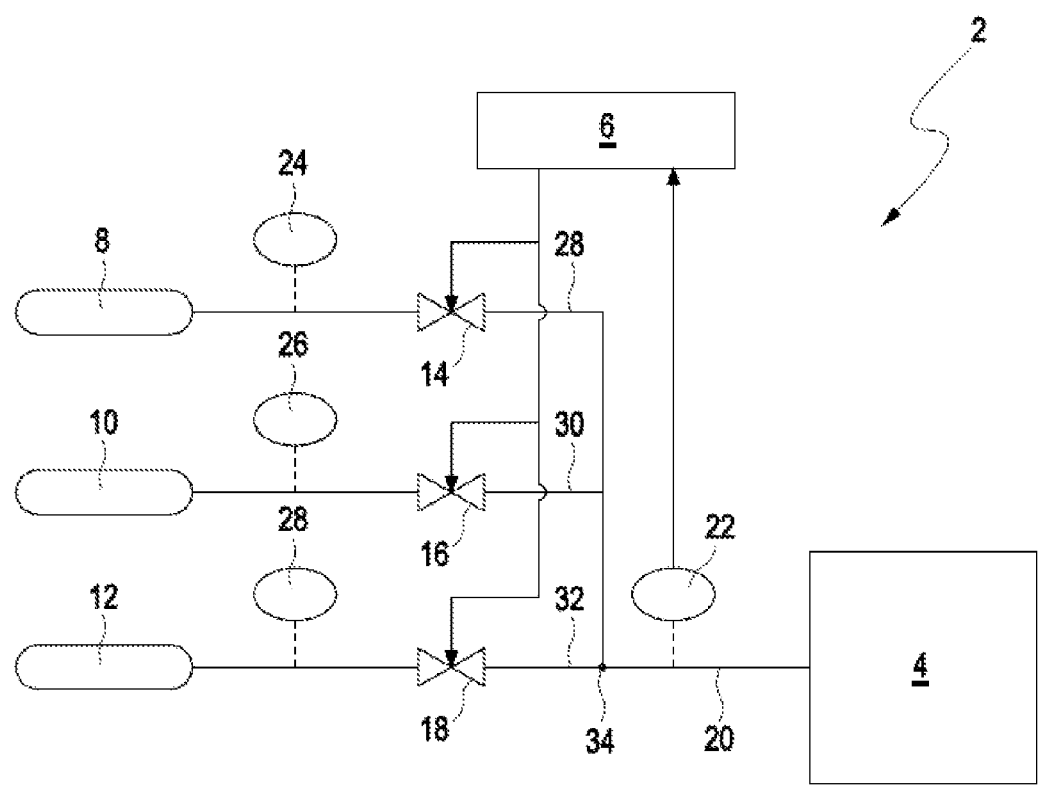

METHOD FOR SUPPLYING A DRIVE UNIT

CROSS REFERENCE TO RELATED APPLICATIONS

This application is based on and hereby claims priority to International Application No. PCT/EP2013/000813 filed on Mar. 18, 2013 and German Application No. 10 2012 005 689.3 filed on Mar. 21, 2012, the contents of which are hereby incorporated by reference.

BACKGROUND

The invention relates to a method and an arrangement for supplying a gas to a drive assembly of a motor vehicle.

Hydrogen that is required for a fuel cell of a drive of a motor vehicle is stored in the motor vehicle, in cylinders provided for this purpose, at a pressure of up to 700 bar. Here, for optimization of an adequate amount of hydrogen, and allowing for minimal loss of interior space and other packaging restrictions, it may be provided that up to 5 such cylinders are arranged in the motor vehicle. Here, each of said cylinders is assigned an electromagnetically actuable shut-off valve which, in order to be opened, must be energized with an electrical current of up to one ampere (1 A). It is furthermore provided that always all of the shut-off valves are energized at the same time, such that up to 5 amperes (60 watts) are required just for opening the shut-off valves.

A vessel system having multiple hydrogen vessels for a fuel cell system is known from the document DE 10 2004 037 851 B4. Said vessel system also comprises a pressure control module which, by way of flow rate regulation modules, adjusts release flow rates of the hydrogen, which altogether form a feed flow rate of the combined flow, individually on the basis of the respective primary pressures of the respective hydrogen vessels, such that the primary pressures of the hydrogen vessels are substantially equalized. Within the vessel system, a selection of the hydrogen vessel with the higher primary pressure, and a command to release the hydrogen at preset times, are repeated in order to successively switch between active vessels for the release of the hydrogen.

A method for opening tank shut-off valves in gas feed systems with connected tanks is described in document DE 10 2006 031 875 B4. Here, said tanks are in the form of pressurized hydrogen gas tanks of a fuel cell system, wherein each pressurized hydrogen gas tank is assigned a tank shut-off valve. Here, upon a start-up of the fuel cell systems, the tank shut-off valves are opened in succession.

A method for controlling a supply of hydrogen to a fuel cell stack of a fuel cell system is described in document DE 10 2005 047 972 B4. In said document, the fuel cell stack is connected to a hydrogen tank via a flow control unit. Furthermore, the fuel cell system comprises three injectors which are controlled in succession in order to increase or reduce a throughput of hydrogen to the fuel cell stack.

SUMMARY

The inventor proposes a method for supplying a gas, which is stored in multiple vessels, to a drive assembly of a motor vehicle. Here, each vessel is assigned a valve for opening and closing the vessel and a gas sensor, in the form of a temperature sensor, for determining a temperature as a state variable of the gas in the respective vessel. The vessels are connected to the drive assembly via a common line. Said common line forms, proceeding from an interface, a common connection of all of the vessels to the drive assembly. Gas can thus flow to the drive assembly from all of the vessels via the common line. Along the common line, there is arranged at least one gas sensor, which is common to all of the vessels, for determining at least one state variable of the gas. For the supply to the drive assembly, in each case only one of the valves is opened. When said valve is open, all of the other valves are closed. The open valve is closed again when at least one determined state variable deviates from a setpoint value by a tolerance value.

This may mean that the open valve is closed when the at least one state variable determined by the at least one common gas sensor deviates from a setpoint value by a tolerance value and/or when the at least one temperature determined by the gas sensor which is in the form of a temperature sensor and which is assigned to the open vessel, said temperature serving as a state variable of the gas in the open vessel, deviates from a setpoint value by a tolerance value.

It is normally the case that the presently open valve, which is assigned to a vessel that is active as a supply unit, is closed, and the valve assigned to another vessel is opened, when either the at least one state variable determined by the common gas sensor in the line common to all of the vessels, or the temperature of the presently active vessel, deviates from the intended setpoint value by a tolerance value.

Here, a temperature of the at least one open vessel can be measured, and a throughput of hydrogen gas for the at least one vessel can be determined on the basis of the Joule-Thomson effect.

The inventor furthermore proposes an arrangement for supplying a gas, which is stored in multiple vessels, to a drive assembly of a motor vehicle, wherein each vessel is assigned a valve for opening and closing the vessel and a gas sensor, in the form of a temperature sensor, for determining a temperature as a state variable of the gas in the vessel. Here, the vessels are connected to the drive assembly via a common line, and wherein, along the common line, there is arranged at least one gas sensor, which is common to all of the vessels, for determining at least one state variable of the gas. The arrangement comprises, as at least one component, a control unit for controlling the valves, wherein the control unit is designed such that, for the supply to the drive assembly, said control unit opens in each case only one of the valves and keeps all of the other valves closed. The control unit is furthermore designed to close the respectively open valve again when at least one determined state variable, that is to say the temperature of the gas in the open vessel or of the at least one state variable in the common line, deviates from a setpoint value by a tolerance value.

In one refinement, it is provided that a gas supply system for a drive assembly comprises multiple vessels, which are normally in the form of cylinders, for storing the gas, wherein each of said vessels is assigned a valve via which gas is supplied from the vessel to the drive assembly when said valve is opened.

In the method for supplying gas to the drive assembly, it is now the case that only one valve of a cylinder is energized, and thus opened, whereas the valves of the other cylinders remain closed. Here, the valves may be activated cyclically in accordance with a sequence. It is thus the case that only one vessel is activated as a supply unit for the drive assembly, wherein the valves of the other cylinders are not energized.

Said vessel remains active as supply unit until a predefined stop threshold, which may be defined for example on the basis of the amount of gas that has been throughput or a predefined drop in pressure of the gas, is reached. Said stop threshold for a state variable of the gas may be either fixedly predefined or varied on a situation-dependent basis, wherein the latter may be provided for example in the case of a pressure drop. The stop threshold may be defined on the basis of a deviation of the state variable of the gas from a setpoint value by a tolerance value.

By implementing the method, electrical current for the activation of the other cylinders can be saved. Furthermore, more accurate gas consumption analysis is possible, which can also be utilized in the context of on-board diagnosis (OBD).

The proposals method and system may be used for example for motor vehicles with fuel cells to which hydrogen gas is provided as gas, but may also be used for motor vehicles powered by natural gas.

During continuous operation of an arrangement for providing a supply to the drive assembly, it is the case in wide ranges of operation of the vessels that an outflow speed of gas from a vessel is so high that opening just one vessel is entirely adequate for supplying gas to, and operating, the drive assembly.

It is self-evident that the features mentioned above and the features yet to be explained below can be used not only in the respectively specified combination but also in other combinations or individually without departing from the scope of the proposals.

BRIEF DESCRIPTION OF THE DRAWINGS

These and other objects and advantages of the present invention will become more apparent and more readily appreciated from the following description of the preferred embodiments, taken in conjunction with the accompanying drawing:

FIG. 1 is a schematic illustration of an embodiment of a proposed system for providing a supply to a drive assembly of a motor vehicle.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The arrangement 2 schematically illustrated in FIG. 1 for providing a supply to a drive assembly 4, which in this case is in the form of a fuel cell, comprises a control unit 6.

For the purpose of providing a supply to the drive assembly 4, multiple vessels 8, 10, 12 are provided, said vessels in this case being in the form of cylinders, wherein each vessel 8, 10, 12 is assigned an in this case vessel-specific valve 14, 16, 18, which can be opened by energization by the control unit 6. Each vessel 8, 10, 12 is connected via the respectively associated valve 14, 16, 18 to a vessel-specific line 28, 30, 32. All of the vessel-specific lines 28, 30, 32 issue, at a common interface 34, into a line 20 that is common to all of the vessels 8, 10, 12.

Gas that is stored in a respective vessel 8, 10, 12 flows through the respectively open valve 14, 16, 18, through the associated vessel-specific line 28, 30, 32 and through the common interface 34 into the line 20 that is common to all of the vessels 8, 10, 12, and said gas is fed to the drive assembly 4 via said common line 20.

Here, a common gas sensor 22 for determining a state variable of the gas is arranged on said common line 20 which is connected downstream of the interface 34 that is common to all of the vessels 8, 10, 12. In one refinement, it is possible for multiple gas sensors 22 that are common to all of the vessels 8, 10, 12 to be arranged along the common line 20, by which gas sensors it is possible for multiple state variables of the gas to be monitored simultaneously in the common line 20.

By said at least one common gas sensor 22, it is possible for a state variable of the gas to be determined before said gas reaches the drive assembly 4.

FIG. 1 furthermore shows vessel-specific gas sensors 24, 26, 28, wherein each of said vessel-specific gas sensors 24, 26, 28 is assigned individually to a vessel 8, 10, 12 and is separated from the common line 20 by the associated vessel-specific valve 14, 16, 18. By said vessel-specific gas sensors 24, 26, 28, it is possible for a state variable of the gas in a respectively associated vessel 8, 10, 12 to be detected. Here, said vessel-specific gas sensors 24, 26, 28 are in the form of temperature sensors, wherein each temperature sensor is used to measure the temperature of the gas in a respective vessel 8, 10, 12 to which said temperature sensor or gas sensor 24, 26, 28 is assigned.

Accordingly, the gas is stored in multiple vessels 8, 10, 12, wherein each vessel 8, 10, 12 is assigned a valve 14, 16, 18 for opening and closing the vessel 8, 10, 12. The vessels 8, 10, 12 are connected to the drive assembly 4 via the common line 20. Along the common line 20 there is arranged at least one gas sensor 22, which is common to all of the vessels 8, 10, 12, for determining at least one state variable of the gas. In the method for providing a supply to the drive assembly 4, in each case only one of the valves 14, 16, 18 is opened, whereas all of the other remaining valves 14, 16, 18 are closed. Accordingly, in the implementation it is the case that only one of the valves 14, 16, 18 is open. The respectively presently open valve 14, 16, 18 is closed when the at least one state variable in the common line 20, as determined by the at least one common gas sensor 22 and/or by the vessel-specific gas sensor 24, 26, 28 which is assigned to the open vessel 8, 10, 12 or valve 14, 16, 18, deviates from a setpoint value by a tolerance value. When a valve 14, 16, 18 is closed under these conditions, one of the other valves 14, 16, 18 is opened if required.

In general, the open valve 14, 16, 18 is closed when one of the determined state variables deviates from a setpoint value by a tolerance value. In one refinement, the open valve 14, 16, 18 is closed when the at least one state variable determined by the at least one common gas sensor 22 deviates from a setpoint value by a tolerance value. Alternatively or in addition, the open valve 14, 16, 18 is closed when the temperature of the gas in the vessel 8, 10, 12 as determined by the gas sensor 24, 26, 28 which is in the form of a temperature sensor and which is assigned to the open vessel 8, 10, 12, said temperature serving as a further state variable, deviates from a setpoint value by a tolerance value.

It is thus additionally possible for a change or decrease, for example of a temperature of an active and thus open vessel 8, 10, 12, as measured by a temperature sensor as gas sensor 24, 26, 28, to be determined on a time-dependent basis. Here, the change in the temperature may be described by the Joule-Thomson effect. Here, a greater amount of hydrogen is extracted from one open vessel 8, 10, 12 than from multiple simultaneously open vessels 8, 10, 12 at the same time, because the Joule-Thomson effect is dependent on throughput. Furthermore, a temperature profile of the non-active, that is to say closed vessels 8, 10, 12 may also be incorporated, wherein a profile of the temperature of the non-active vessels 8, 10, 12 should follow a long-term trend of the temperature of the air in the environment. That is, the temperature of a closed vessel 8, 10, 12 may be monitored for consistency with an ambient temperature.

The method may be performed during continuous operation or during ongoing operation of the drive assembly 4.

A sequence may be defined for the vessels 8, 10, 12, wherein the valves 14, 16, 18 assigned to the vessels 8, 10, 12 are opened successively in accordance with the sequence as required.

By way of the combination of setpoint value and tolerance value, it is possible to define a stop threshold for the at least one state variable. Here, the setpoint value may be adapted on a situation-dependent basis or fixedly predefined. The tolerance value may alternatively or additionally likewise be adapted on a situation-dependent basis or fixedly predefined.

If the presently open valve 14, 16, 18 should be closed when the at least one monitored state variable increases proceeding from a low value of the state variable and reaches or exceeds the stop threshold for said state variable, the stop threshold may be defined as setpoint value minus a tolerance value, or may be adapted on a situation-dependent basis. If the open valve 14, 16, 18 should be closed when the at least one monitored state variable decreases from a relatively high value of the state variable and reaches or falls below the stop threshold for the state variable, the stop threshold may be defined as setpoint value plus a tolerance value, or may be adapted on a situation-dependent basis. It is also possible for the valve 14, 16, 18 to be closed when a present value of the at least one state variable deviates from a setpoint value by a tolerance value. In this case, an upper stop threshold and a lower stop threshold are provided which may be defined or may be adapted on a situation-dependent basis. An adaptation of the tolerance value and/or of the setpoint value for the at least one state variable on a situation-dependent basis is generally performed as a function of a present operating state of the drive assembly and/or of at least one of the vessels 8, 10, 12.

The at least one common gas sensor 22 may measure, as the at least one state variable, a pressure of the gas in the common line 20. It is also possible by the at least one common gas sensor 22 for a flow rate or temperature of the gas flowing in the common line 22 to be measured as at least one state variable.

The method may be performed for a drive assembly 4 which is in the form of a fuel cell, wherein the fuel cell is supplied with hydrogen or hydrogen gas. Alternatively, the method may be performed for a drive assembly 4 which is in the form of an internal combustion engine, wherein the internal combustion engine is supplied with natural gas.

The control unit 6 is designed to monitor, and thus control and/or regulate the method. This means that the control unit 6 monitors the at least one state variable as determined by the at least one gas sensor 22 in order to provide an electrical current to the valve 14, 16, 18 that is respectively to be opened. As a function of a respective value of the at least one state variable, the control unit 6 closes an open valve 14, 16, 18 and opens the next valve 14, 16, 18, for example in accordance with the sequence. The at least one gas sensor 22 may if appropriate be provided as a component of the arrangement 2, and may be in the form of a pressure sensor and/or gas flow rate sensor.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for supplying a gas, which is stored in multiple vessels, to a drive assembly of a motor vehicle, comprising:
    opening and closing each vessel with a respective valve assigned to the vessel, each valve being open when energized and closed when not energized;
    measuring as state variables, a temperature of the gas stored in each vessel with a respective gas sensor in the form of a temperature sensor assigned to the vessel;
    supplying gas from the vessels to the drive assembly via a common line which connects the vessels to the drive assembly;
    measuring a state variable of the gas in the common line using a gas sensor arranged at the common line;
    energizing and thereby opening as an open valve only one of the valves while not energizing and thereby closing all other valves, to supply gas to the drive assembly;
    calculating a change between temperatures measured by the temperature sensor of the open vessel on a time-dependent basis, the change between the temperatures being calculated according to a Joule-Thomson effect; and
    closing the open valve when at least one of the state variables deviates from a setpoint value by a tolerance value,
    wherein the open valve, which supplies gas to the drive assembly while all other valves are closed, is closed at least when the state variable of the gas in the common line deviates from the setpoint value by the tolerance value.

2. The method as claimed in claim 1, wherein the open valve is closed at least when the state variable of the temperature of the gas stored in the open vessel deviates from the setpoint value by the tolerance value.

3. The method as claimed in claim 1, wherein the method is performed continuously during operation of the drive assembly.

4. The method as claimed in claim 1, wherein the valves assigned to the vessels are opened successively in accordance with a defined sequence.

5. The method as claimed in claim 4, wherein when the open valve is closed, a next valve in the sequence is opened.

6. The method as claimed in claim 1, wherein the setpoint value is adapted on a situation-dependent basis.

7. The method as claimed in claim 1, wherein the setpoint value is fixedly predefined.

8. The method as claimed in claim 1, wherein the tolerance value is adapted on a situation-dependent basis.

9. The method as claimed in claim 1, wherein the tolerance value is fixedly predefined.

10. The method as claimed in claim 1, wherein
    the gas sensor arranged at the common line is a pressure sensor, and
    the state variable of the gas in the common line is a pressure of the gas in the common line.

11. The method as claimed in claim 1, wherein
    the gas sensor arranged at the common line is a flow rate sensor, and
    the state variable of the gas in the common line is a flow rate of the gas in the common line.

12. The method as claimed in claim 1, wherein
the drive assembly is a fuel cell, and
the gas is hydrogen.

13. The method as claimed in claim 1, wherein
the drive assembly is an internal combustion engine, and
the gas is natural gas.

14. The method as claimed in claim 1, wherein based on the Joule Thomson effect, a gas throughput is determined from the temperature of the gas stored in the open vessel.

15. The method as claimed in claim 14, wherein the tolerance value and/or the setpoint value is varied based on an operating state of the drive assembly.

16. The method as claimed in claim 14, wherein the setpoint value is defined so that the open vessel is closed after a defined amount of gas that has been throughput from the open vessel.

17. The method as claimed in claim 1, wherein the temperature of a closed vessel is monitored for consistency with an ambient temperature.

18. The method as claimed in claim 1, wherein
the state variable of the gas in the common line includes a flow rate of the gas in the common line obtained from a flow rate sensor which corresponds to the gas sensor, and
the open valve, which supplies gas to the drive assembly while all other valves are closed, is closed at least when the flow rate of the gas in the common line deviates from the setpoint value by the tolerance value.

19. A system to supply a gas, which is stored in a plurality of vessels, to a drive assembly of a motor vehicle, the system comprising:

a plurality of valves assigned respectively to the plurality of vessels, each valve opening a respective vessel when energized and closing the respective vessel when not energized;

a plurality of gas sensors assigned respectively to the plurality of vessels, each gas sensor being in the form of a temperature sensor to determine as a state variable, a temperature of the gas in the respective vessel;

a gas sensor arranged along a common line that connects the vessels to the drive assembly, to determine a state variable of the gas in the common line;

a control unit to:

control the valves, energize and thereby open as an open valve, only one of the valves while keeping all of the other valves not energized and thereby closed, to supply gas to the drive assembly, close the open valve when at least one of the state variables deviates from a setpoint value by a tolerance value, and calculate a change between temperatures measured by the temperature sensor of the open vessel on a time-dependent basis, the change between the temperatures being calculated according to a Joule-Thomson effect, wherein the open valve, which supplies gas to the drive assembly while all other valves are closed, is closed by the control unit at least when the state variable of the gas in the common line deviates from the setpoint value by the tolerance value.

20. The system as claimed in claim 19, wherein the control unit provides an electrical current to the open valve.

* * * * *